/ 100

(12) United States Patent
Sen et al.

(10) Patent No.: US 10,152,525 B2
(45) Date of Patent: Dec. 11, 2018

(54) METHODS AND SYSTEMS FOR TRANSFORMING TRAINING DATA TO IMPROVE DATA CLASSIFICATION

(71) Applicant: Wipro Limited, Bangalore (IN)

(72) Inventors: Surajit Sen, Bangalore (IN); Chetan Narasimha Yadati, Bangalore (IN)

(73) Assignee: Wipro Limited, Bangalore (IN)

( * ) Notice: Subject to any disclaimer, the term of this patent is extended or adjusted under 35 U.S.C. 154(b) by 231 days.

(21) Appl. No.: 15/217,282

(22) Filed: Jul. 22, 2016

(65) Prior Publication Data
US 2017/0344617 A1    Nov. 30, 2017

(30) Foreign Application Priority Data

May 31, 2016 (IN) .............................. 201641018640

(51) Int. Cl.
    G06F 17/30    (2006.01)
    G06N 99/00    (2010.01)
    G06N 5/02     (2006.01)

(52) U.S. Cl.
    CPC .. G06F 17/30569 (2013.01); G06F 17/30598 (2013.01); G06F 17/30616 (2013.01);
    (Continued)

(58) Field of Classification Search
    CPC ......... G06F 17/30569; G06F 17/30616; G06F 17/30598; G06F 17/30705; G06N 5/022; G06N 99/005
    (Continued)

(56) References Cited

U.S. PATENT DOCUMENTS 7,426,497 B2    9/2008  Bacioiu et al.
7,647,349 B2    1/2010  Hubert et al.
(Continued)

OTHER PUBLICATIONS

Said, D.A., "Dimensionality reduction techniques for enhancing automatic text categorization", retrieved from the internet: URL:http://people.ucalgary.ca/~dasaid/TC-thesis.pdf, *Faculty of Engineering, Cairo University*, Jan. 1, 2007, 197 pages.
(Continued)

*Primary Examiner* — Greta L Robinson
(74) *Attorney, Agent, or Firm* — Finnegan, Henderson, Farabow, Garret & Dunner L.L.P.

(57) ABSTRACT

In one embodiment, a method for transforming training data to improve data classification is disclosed. The method comprises extracting concepts from a training data set. The method comprises computing frequency of occurrence of each concept in each category and removing concepts from the data records when the frequency of occurrence of a concept in a category is less than a threshold frequency value. Further, the method comprises computing a percentage contribution of each concept of remaining concepts in each category upon removing the concepts and eliminating concepts, from the remaining concepts, contributing equally to each category based on the percentage contribution of each concept to provide a reformed training data set. Further, the method comprises appending a category name to a corresponding data record in the reformed training data set based on a normalized frequency of occurrence of the concept in a category to improve data classification.

18 Claims, 5 Drawing Sheets

(52) U.S. Cl.
CPC ....... *G06F 17/30705* (2013.01); *G06N 5/022* (2013.01); *G06N 99/005* (2013.01)

(58) Field of Classification Search
USPC .............................. 707/730, 732, 740, 750
See application file for complete search history.

(56) References Cited

U.S. PATENT DOCUMENTS

| | | | | |
|---|---|---|---|---|
| 8,650,136 | B2* | 2/2014 | Goyal | G06F 17/30705 706/12 |
| 2007/0282824 | A1* | 12/2007 | Ellingsworth | G06F 17/30707 |
| 2008/0046486 | A1* | 2/2008 | Huang | G06F 17/30707 |
| 2012/0166441 | A1 | 6/2012 | Karidi et al. | |
| 2013/0117202 | A1 | 5/2013 | Malka et al. | |
| 2013/0325759 | A1* | 12/2013 | Rachevsky | G06N 99/005 706/12 |
| 2013/0332408 | A1* | 12/2013 | Faruquie | G06F 17/30563 707/602 |
| 2014/0122486 | A1* | 5/2014 | Simard | G06N 99/005 707/737 |

OTHER PUBLICATIONS

Xu, Y., et al., "An extended document frequency metric for feature selection in text categorization", Jan. 15, 2008, *LNCS* 4993, 2008, pp. 71-82.
Extended European Search Report issued in the European Patent Office in counterpart European Application No. 16207205.2, dated Aug. 10, 2017, 14 pages.

* cited by examiner

METHODS AND SYSTEMS FOR TRANSFORMING TRAINING DATA TO IMPROVE DATA CLASSIFICATION

TECHNICAL FIELD

This disclosure relates generally to data classification, and more particularly to methods and systems for transforming training data to improve data classification.

BACKGROUND

In order to improve accuracy of data classification, the data is required to be cleansed. The data cleansing involves removal of noise to achieve higher accuracy in the data classification. The noise may be relevant but unusable, irrelevant, or usable. The relevant but unusable noise may comprise phrases or concepts which are relevant to all categories. For example, consider a data set which requires classification into subsystems. The phrases such as "not working" present in the data set may not require analysis as any subsystem may be in a "not working" mode. Therefore, it is necessary to remove relevant but unusable noise to improve the data classification accuracy.

On the other hand, usable noise comprises phrases which might be specific to certain categories. For example, a word 'enter' may be specific to a user access subsystem, although in general, the word 'enter' might be considered a stop word. Therefore, the presence of usable noise in the data set is significant for accurate data classification. The existing methods of data cleansing fail to remove the relevant but unusable noise while retaining the usable noise to improve the data classification.

SUMMARY

In one embodiment, a method for transforming training data to improve data classification is disclosed. The method comprises extracting concepts from a training data set, wherein the training data set comprises data records corresponding to one or more categories. The method comprises computing frequency of occurrence of each concept in each category of the one or more categories and removing one or more concepts from the data records when the frequency of occurrence of a concept in a category is less than a threshold frequency value. Further, the method comprises computing a percentage contribution of each concept of remaining concepts in each category upon removing the one or more concepts and eliminating concepts, from the remaining concepts, contributing equally to each category based on the percentage contribution of each concept to provide a reformed training data set. Further, the method comprises appending a category name to a corresponding data record in the reformed training data set based on a normalized frequency of occurrence of the concept in a category to improve data classification.

In one embodiment, a data transforming system for transforming training data to improve data classification is disclosed. The data transforming system comprises a processor and a memory communicatively coupled to the processor. The memory stores processor instructions, which, on execution, causes the processor to extract concepts from a training data set, wherein the training data set comprises data records corresponding to one or more categories. The processor is caused to compute frequency of occurrence of each concept in each category of the one or more categories and remove one or more concepts from the data records when the frequency of occurrence of a concept in a category is less than a threshold frequency value. Further, the processor is caused to compute a percentage contribution of each concept of remaining concepts in each category upon removing the one or more concepts and eliminate concepts, from the remaining concepts, contributing equally to each category based on the percentage contribution of each concept to provide a reformed training data set. Further, the processor is caused to append a category name to a corresponding data record in the reformed training data set based on a normalized frequency of occurrence of the concept in a category to improve data classification.

In one embodiment, a non-transitory computer-readable medium storing computer-executable instructions is disclosed. The instructions comprises extracting concepts from a training data set, wherein the training data set comprises data records corresponding to one or more categories. Further, the instructions comprises computing frequency of occurrence of each concept in each category of the one or more categories and removing one or more concepts from the data records when the frequency of occurrence of a concept in a category is less than a threshold frequency value. The instructions comprises computing a percentage contribution of each concept of remaining concepts in each category upon removing the one or more concepts and eliminating concepts, from the remaining concepts, contributing equally to each category based on the percentage contribution of each concept to provide a reformed training data set. Further, the instructions comprises appending a category name to a corresponding data record in the reformed training data set based on a normalized frequency of occurrence of the concept in a category to improve data classification.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present subject matter discloses systems and methods for transforming training data to improve data classification. The systems and methods may be implemented in a variety of computing systems. The computing systems that can implement the described method(s) include, but are not limited to a server, a desktop personal computer, a notebook or a portable computer, hand-held devices, and a mainframe computer. Although the description herein is with reference to certain computing systems, the systems and methods may be implemented in other computing systems, albeit with a few variations, as will be understood by a person skilled in the art.

Figure 1:
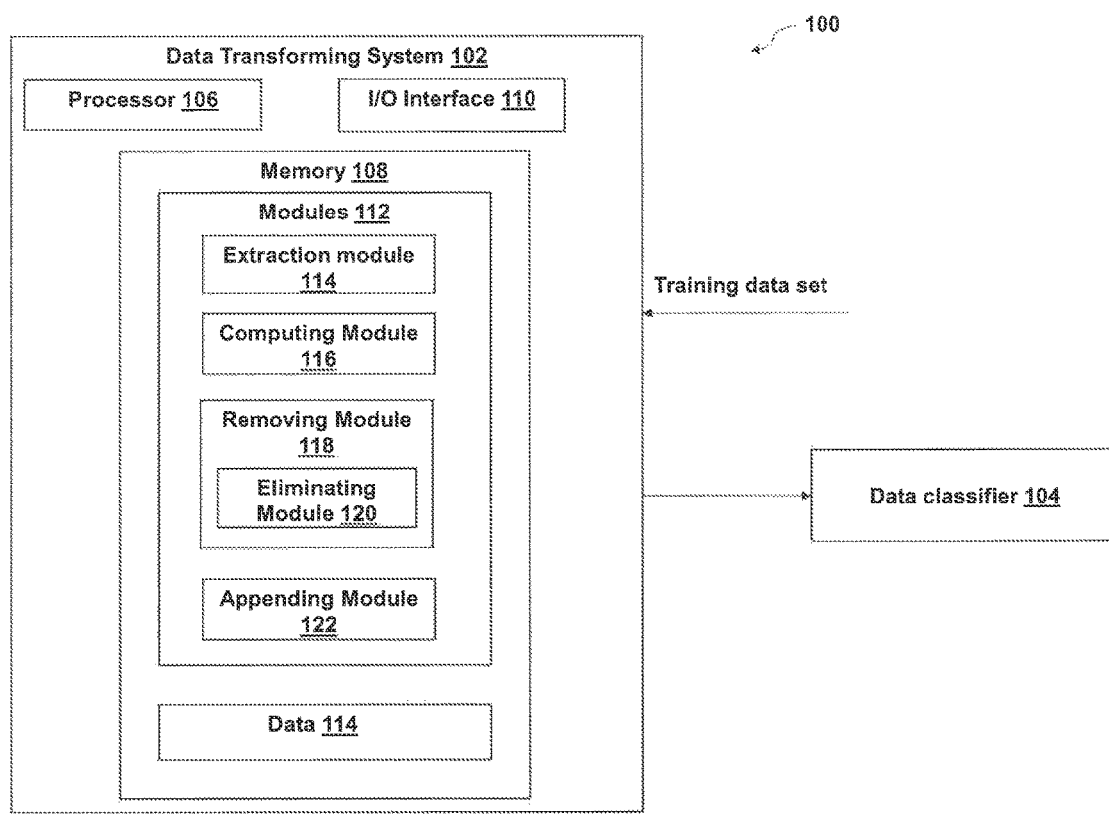
FIG. 1 illustrates an exemplary network implementation comprising a data transforming system for transforming training data to improve data classification, according to some embodiments of the present disclosure.
Figure 2:
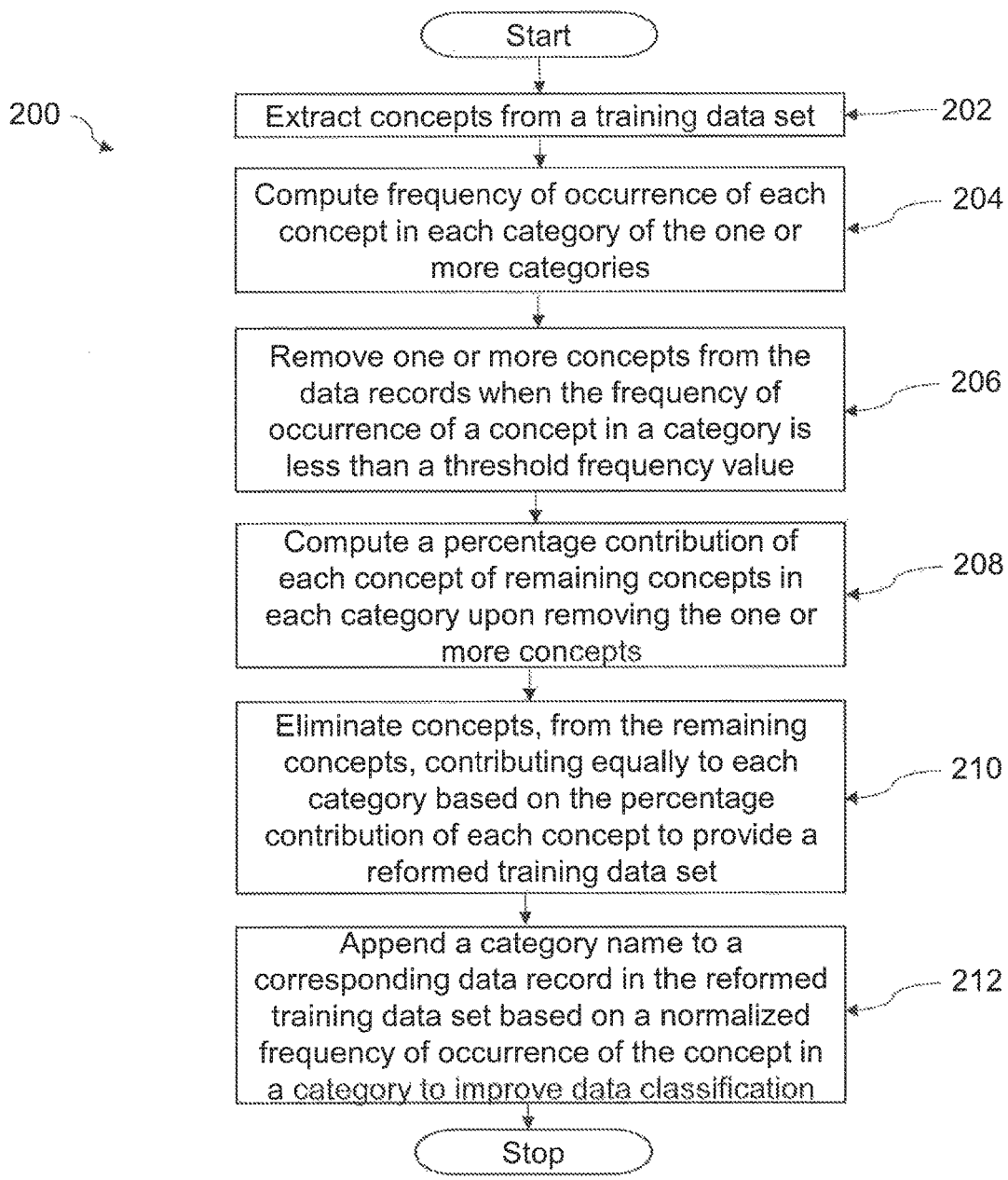
FIG. 2 is a flow diagram illustrating a method for transforming training data to improve data classification in accordance with some embodiments of the present disclosure.
Figure 3:
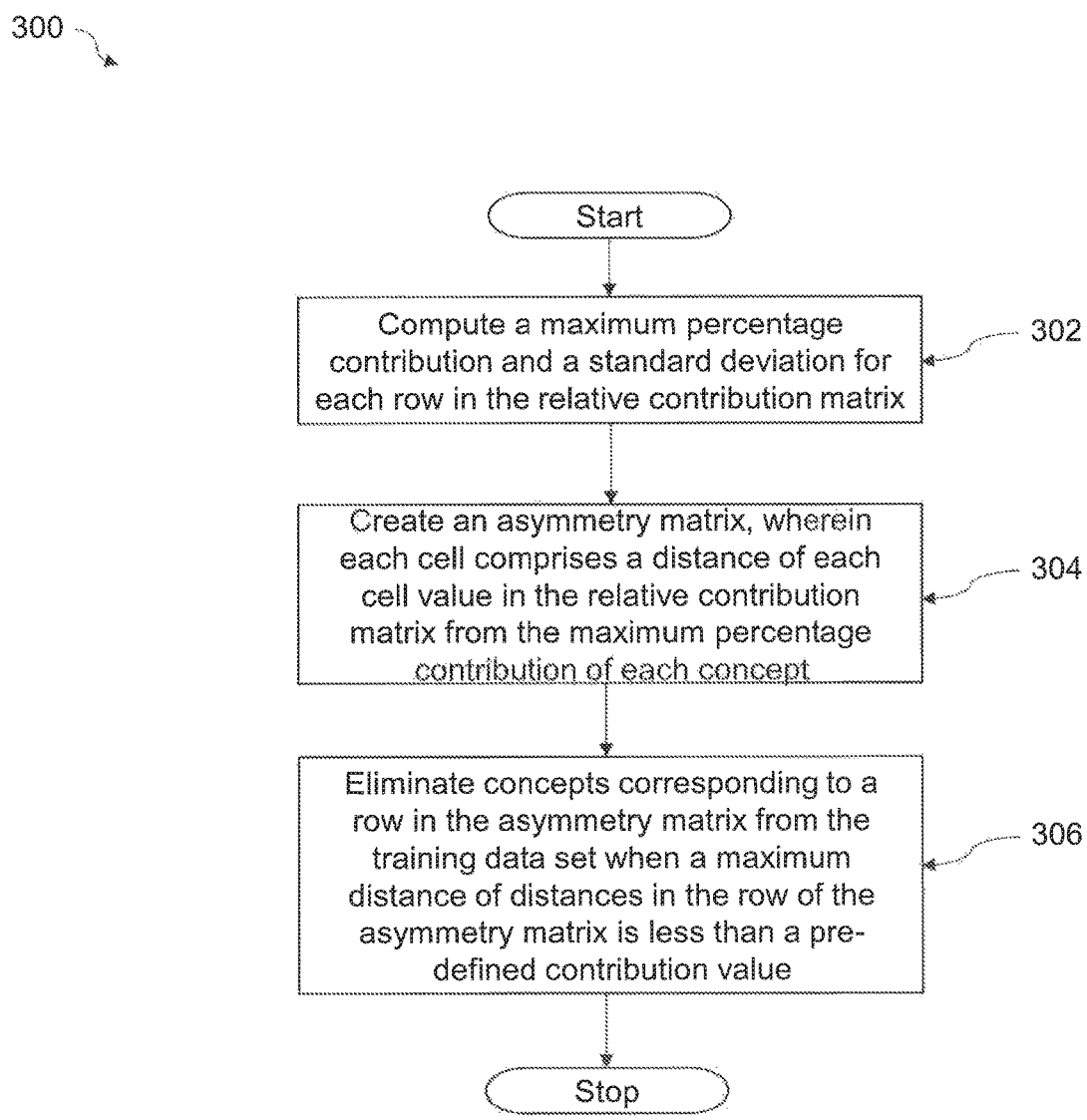
FIG. 3 is a flow diagram illustrating a method for eliminating concepts corresponding to a row in an asymmetry matrix from a training data set in accordance with some embodiments of the present disclosure.

Working of the systems and methods for transforming training data to improve data classification is described in conjunction with FIGS. 1-3. It should be noted that the description and drawings merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and are to be construed as being without limitation to such specifically recited examples and conditions. Moreover, all statements herein reciting principles, aspects, and embodiments of the present subject matter, as well as specific examples thereof, are intended to encompass equivalents thereof. While aspects of the systems and methods can be implemented in any number of different computing systems environments, and/or configurations, the embodiments are described in the context of the following exemplary system architecture(s).

FIG. 1 illustrates an exemplary network implementation 100 comprising a data transforming system 102 for transforming training data to improve data classification according to some embodiments of the present disclosure. As shown in the FIG. 1, the data transforming system 102 is communicatively coupled to a data classifier 104. Further, a training data set may be provided as an input to the data transforming system 102. The data transforming system 102 may transform the training data set and provide the transformed training data set as an input to the data classifier 104. The data classifier 104 may be trained using the transformed training data set to improve data classification of a similar data set.

The data transforming system 102 may be communicatively coupled to the data classifier 104 through a network. The network may be a wireless network, wired network or a combination thereof. The network can be implemented as one of the different types of networks, such as intranet, local area network (LAN), wide area network (WAN), the internet, and such. The network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network may include a variety of network devices, including routers, bridges, servers, computing devices, storage devices, etc.

As shown in the FIG. 1, the data transforming system 102 comprises a processor 106, a memory 108 coupled to the processor 106, and input/output (I/O) interface(s) 110. The processor 106 may be implemented as one or more microprocessors, microcomputers, microcontrollers, digital signal processors, central processing units, state machines, logic circuitries, and/or any devices that manipulate signals based on operational instructions. Among other capabilities, the processor 106 is configured to fetch and execute computer-readable instructions stored in the memory 108. The memory 108 can include any non-transitory computer-readable medium known in the art including, for example, volatile memory (e.g., RAM), and/or non-volatile memory (e.g., EPROM, flash memory, etc.).

The I/O interface(s) 110 may include a variety of software and hardware interfaces, for example, a web interface, a graphical user interface, etc., allowing the data transforming system 102 to interact with the data classifier 104. Further, the I/O interface(s) 110 may enable the data transforming system 102 to communicate with other computing devices. The I/O interface(s) 110 can facilitate multiple communications within a wide variety of networks and protocol types, including wired networks, for example LAN, cable, etc., and wireless networks such as WLAN, cellular, or satellite. The I/O interface(s) 110 may include one or more ports for connecting a number of devices to each other or to another server.

In one implementation, the memory 108 includes modules 112 and data 114. In one example, the modules 112, amongst other things, include routines, programs, objects, components, and data structures, which perform particular tasks or implement particular abstract data types. The modules 112 may also be implemented as, signal processor(s), state machine(s), logic circuitries, and/or any other device or component that manipulate signals based on operational instructions. Further, the modules 112 can be implemented by one or more hardware components, by computer-readable instructions executed by a processing unit, or by a combination thereof.

In one implementation, the data 114 serves, amongst other things, as a repository for storing data fetched, processed, received and generated by one or more of the modules 112. In one embodiment, the data 114 may be stored in the memory 108 in the form of various data structures. Additionally, the aforementioned data can be organized using data models, such as relational or hierarchical data models. In an example, the data 114 may also comprise other data used to store data, including temporary data and temporary files, generated by the modules 112 for performing the various functions of the data transforming system 102.

In one implementation, the modules 112 further include an extraction module 114, a computing module 116, a removing module 118, an eliminating module 120, and an appending module 122. In an example, the modules 112 may also comprise other modules. The other modules may perform various miscellaneous functionalities of the data transforming system 102. It will be appreciated that such aforementioned modules may be represented as a single module or a combination of different modules.

In order to transform training data to improve data classification, the extraction module 114 may extract concepts from a training data set. In an example, a concept may comprise one or more words or one or more phrases present in the training data set. The training data set may comprise data records corresponding to one or more categories. Specifically, each data record may be labelled with a category. In one embodiment, a data record may comprise text which may undergo classification. Hereinafter, the terms 'word' and 'concept' may be used alternatively, After extracting the concepts from the training data set, the computing module 116 may compute frequency of occurrence of each concept in each category of the one or more categories. The frequency of occurrence of each concept in each category may be computed by creating a concept frequency matrix. A column in the concept frequency matrix may represent a category and a row may represent a concept. In an example, if each entry in the concept frequency matrix (M) may be denoted as $m_c^i$, then an entry in the concept frequency matrix may represent a number of data records that are labelled with category 'c' and contain the concept 'i'. In an example, the Table 1 below demonstrates a concept frequency matrix.

TABLE 1

| Concept/Word | Category 1 | Category 2 | Category 3 | Category 4 |
|---|---|---|---|---|
| Error | 11 | 6 | 1 | 7 |
| Script | 10 | 0 | 0 | 1 |
| Editor | 2 | 1 | 8 | 8 |
| ICM | 8 | 1 | 0 | 0 |
| Agent | 6 | 14 | 1 | 1 |
| Config | 2 | 2 | 1 | 1 |
| Web | 6 | 0 | 0 | 1 |
| HDS | 5 | 5 | 2 | 1 |
| Client | 5 | 1 | 0 | 0 |
| AD | 5 | 0 | 0 | 0 |
| Fails | 2 | 3 | 2 | 1 |
| Agents | 2 | 6 | 0 | 3 |
| DB | 1 | 0 | 2 | 2 |
| Finesse | 0 | 27 | 0 | 13 |

As demonstrated in the Table 1, the frequency of occurrence of the word 'error' in the category 1 is 11, the frequency of occurrence in the category 2 is 6, the frequency of occurrence in the category 3 is 1, and the frequency of occurrence in the category 4 is 7. Similarly, the frequency of occurrence of each concept in each category may be computed based on the concept frequency matrix.

After computing the frequency of occurrence of each concept in each category, the removing module 118 may remove one or more concepts from the data records when the frequency of occurrence of a concept in a category is less than a threshold frequency value. The threshold frequency value may be computed dynamically based on the concept frequency matrix. In an example, the removing of one or more concepts from the records may be demonstrated using the Table 2 shown below.

TABLE 2

| Word | Category 1 | Category 2 | Category 3 | Category 4 | Row Sum | >QRT1 |
|---|---|---|---|---|---|---|
| Error | 11 | 6 | 1 | 7 | 25 | 1 |
| Script | 10 | 0 | 0 | 1 | 11 | 1 |
| Editor | 2 | 1 | 8 | 8 | 19 | 1 |
| ICM | 8 | 1 | 0 | 0 | 9 | 1 |
| Agent | 6 | 14 | 1 | 1 | 22 | 1 |
| Config | 2 | 2 | 1 | 1 | 6 | 1 |
| Web | 6 | 0 | 0 | 1 | 7 | 1 |
| HDS | 5 | 5 | 2 | 1 | 13 | 1 |
| Client | 5 | 1 | 0 | 0 | 6 | 1 |
| AD | 5 | 0 | 0 | 0 | 5 | 1 |
| Fails | 2 | 3 | 2 | 1 | 8 | 1 |
| Agents | 2 | 6 | 0 | 3 | 11 | 1 |

TABLE 2-continued

| Word | Category 1 | Category 2 | Category 3 | Category 4 | Row Sum | >QRT1 |
|---|---|---|---|---|---|---|
| DB | 1 | 0 | 2 | 2 | 5 | 1 |
| Finesse | 0 | 27 | 0 | 13 | 40 | 1 |

As shown in the Table 2, in order to compute the threshold frequency value, row sums for each row may be computed for the concept frequency matrix. Further, repeated values may be removed from a vector of the row sums. After removing the repeated values from the row sums, quartiles may be computed for each row in the concept frequency matrix. A value of lower quartile from the quartiles for each row may be used as the threshold frequency value. Upon computing the threshold frequency value, the removing module 118 may remove the concepts from the data records if corresponding row sum is less that the threshold frequency value. Further, the corresponding rows may be removed from the concept frequency matrix. In an example, as shown in the Table 2, as the row sums of all the concepts in the concept frequency matrix is greater than the threshold frequency value, the concepts are retained in the data records.

After removing the one or more concepts from the data records, the computing module 116 may compute a percentage contribution of each concept of remaining concepts in each category. The percentage contribution of each concept in each category may be computed by dividing each of the entries in the concept frequency matrix by their row sums and multiplying result by 100. The computation of the percentage contribution of each concept in each category is shown below in the equation 1.

$$x_c^i = \left( \frac{m_c^i}{\sum_{c=1}^{n} m_c^i} \right) * 100 \qquad 1$$

After computing the percentage contribution of each concept in each category, a relative contribution matrix may be created using the percentage contribution of each concept. The relative contribution matrix may also comprise the maximum percentage contribution ($X_{max}^i$) and standard deviation $\sigma^i$ for each row. The Table 3 below demonstrates the relative contribution matrix comprising the standard deviation and the maximum percentage contribution (Max) for each row,

TABLE 3

| Word | Category 1 | Category 2 | Category 3 | Category 4 | Standard Deviation | Max |
|---|---|---|---|---|---|---|
| Error | 44 | 24 | 4 | 28 | 16 | 44 |
| Script | 91 | 0 | 0 | 9 | 44 | 91 |
| Editor | 11 | 5 | 42 | 42 | 20 | 42 |
| ICM | 89 | 11 | 0 | 0 | 43 | 89 |
| Agent | 27 | 64 | 5 | 5 | 28 | 64 |
| Config | 33 | 33 | 17 | 17 | 10 | 33 |
| Web | 86 | 0 | 0 | 14 | 41 | 86 |
| HDS | 38 | 38 | 15 | 8 | 16 | 38 |
| Client | 83 | 17 | 0 | 0 | 40 | 83 |
| AD | 100 | 0 | 0 | 0 | 50 | 100 |
| Fails | 25 | 38 | 25 | 13 | 10 | 38 |
| Agents | 18 | 55 | 0 | 27 | 23 | 55 |

TABLE 3-continued

| Word | Category 1 | Category 2 | Category 3 | Category 4 | Standard Deviation | Max |
|---|---|---|---|---|---|---|
| DB | 20 | 0 | 40 | 40 | 19 | 40 |
| Finesse | 0 | 68 | 0 | 33 | 32 | 68 |

After creating the relative contribution matrix, the eliminating module 120 may eliminate concepts, from the remaining concepts, contributing equally to each category. The concepts contributing equally to each category may be identified based on the percentage contribution of each concept. After eliminating the concepts contributing equally to each category, the training data set may be cleansed to provide a reformed training data set.

In order to identify concepts contributing equally to each category, an asymmetry matrix may be created using the percentage contribution of each concept in each category provided in the relative contribution matrix. Each cell value ($a_c^i$) of the asymmetry matrix (A) may be computed using the below equation 2.

$$a_c^i = \left( \frac{X_{max}^i - x_c^i}{\sigma^i} \right) \qquad 2$$

Each cell value in the asymmetry matrix may represent a distance of each cell value in the relative contribution matrix from the maximum percentage contribution of each concept. The distance of each cell value in the relative contribution matrix from the maximum percentage contribution of each concept may be computed based on standard deviation for each row in the relative contribution matrix. In an example, Table 4 below demonstrates the asymmetry matrix created based on the relative contribution matrix.

TABLE 4

| Word | Category 1 | Category 2 | Category 3 | Category 4 | Standard Deviation | Max | Distance from Max | | | | Max Distance |
|---|---|---|---|---|---|---|---|---|---|---|---|
| Error | 44 | 24 | 4 | 28 | 16 | 44 | 0.00 | 1.22 | 2.43 | 0.97 | 2.43 |
| Script | 91 | 0 | 0 | 9 | 44 | 91 | 0.00 | 2.06 | 2.06 | 1.85 | 2.06 |
| Editor | 11 | 5 | 42 | 42 | 20 | 42 | 1.59 | 1.85 | 0.00 | 0.00 | 1.85 |
| ICM | 89 | 11 | 0 | 0 | 43 | 89 | 0.00 | 1.81 | 2.07 | 2.07 | 2.07 |
| Agent | 27 | 64 | 5 | 5 | 28 | 64 | 1.30 | 0.00 | 2.12 | 2.12 | 2.12 |
| Config | 33 | 33 | 17 | 17 | 10 | 33 | 0.00 | 0.00 | 1.73 | 1.73 | 1.73 |
| Web | 86 | 0 | 0 | 14 | 41 | 86 | 0.00 | 2.09 | 2.09 | 1.74 | 2.09 |
| HDS | 38 | 38 | 15 | 8 | 16 | 38 | 0.00 | 0.00 | 1.46 | 1.94 | 1.94 |
| Client | 83 | 17 | 0 | 0 | 40 | 83 | 0.00 | 1.68 | 2.10 | 2.10 | 2.10 |
| AD | 100 | 0 | 0 | 0 | 50 | 100 | 0.00 | 2.00 | 2.00 | 2.00 | 2.00 |
| Fails | 25 | 38 | 25 | 13 | 10 | 38 | 1.22 | 0.00 | 1.22 | 2.45 | 2.45 |
| Agents | 18 | 55 | 0 | 27 | 23 | 55 | 1.60 | 0.00 | 2.40 | 1.20 | 2.40 |
| DB | 20 | 0 | 40 | 40 | 19 | 40 | 1.04 | 2.09 | 0.00 | 0.00 | 2.09 |
| Finesse | 0 | 68 | 0 | 33 | 32 | 68 | 2.10 | 0.00 | 2.10 | 1.09 | 2.10 |

Upon creating the asymmetry matrix, the eliminating module 120 may eliminate concepts corresponding to a row in the asymmetry matrix from the training data set when a maximum distance of distances in the row of the asymmetry matrix is less than a pre-defined contribution value. In an example, the pre-defined contribution value may be 1.96. Thus, if a concept has percentage contribution that is not 1.96 standard deviations away, then the concept may not be identifying any category in a significant way. As the concept may not be required for data classification, the eliminating module 120 may eliminate the concept from the data records. As shown in the Table 4, the concepts 'Editor', 'Config' and 'HDS' have a percentage contribution less than 1.96. Therefore, the eliminating module 120 may eliminate the 'Editor', 'Config' and 'HDS' from the training data set as the concepts may not identify any category in a significant way.

On the other hand, if a concept has percentage contribution to a category that is at least 1.96 standard deviations away, then it may be concluded that there is significant asymmetry and the concept may identify a category in a significant way. The eliminating module 120 may retain such concepts in the data records. Thus, the eliminating module 120 may eliminate relevant but unusable noise from the training data set to provide a reformed training data set.

The removal of the relevant but unusable noise may allow the data classifier 104 to emphasize on portions of the text which may be essential for the data classification rather than portions of the text which may be legitimate but are not essential for the data classification. Moreover, the reformed training data set retains the usable noise. The usable noise may comprise concepts, words, or phrases dominantly present in some categories than other categories. The presence of the usable noise may allow the data classifier 104 to classify a sentence or data record into a category accurately.

After eliminating the relevant but unusable noise, the reformed training data set may be enhanced for improved data classification. In order to enhance the reformed training data set, the appending module 122 may append a category name to a corresponding data record in the reformed training data set based on a normalized frequency of occurrence of the concept in a category. In order to append the category name to the corresponding data record in the reformed training data set, the appending module 122 may create a domain concept frequency matrix (D) comprising concepts in the reformed training data set and the frequency of occurrence of each concept in each category. Further, a maximum value in each column j of the domain frequency matrix $max_j$ and a minimum value in each column j termed $min_j$ may be computed. After computing the maximum and the minimum value, the frequency of occurrence of each concept in each category may be normalized to provide normalized frequency of occurrence. The normalized frequency of occurrence may be computed using the below equation 3.

$$e_j^i = \left\lceil \frac{d_j^i - \min_j}{\max_j - \min_j} \right\rceil * H \qquad 3$$

As shown in the equation 3, constant 'H' may be a scaling factor. In an example, the scaling factor may be equal to 10. Further, the normalized frequency of occurrence may be used to create a matrix E. In the matrix E, a column may indicate a category and a row may indicate a concept.

In an example, the Table 5 below demonstrates the domain concept frequency matrix (D) and the matrix E.

TABLE 5

|  | Category 1 | Category 2 | Category 3 | Category 4 | Category Definition Index |  |  |  |
|---|---|---|---|---|---|---|---|---|
| Word |  |  |  |  | Category 1 | Category 2 | Category 3 | Category 4 |
| Error | 11 | 6 | 1 | 7 | 10 | 2 | FALSE | 5 |
| Script | 10 | 0 | 0 | 1 | 9 | FALSE | FALSE | FALSE |
| ICM | 8 | 1 | 0 | 0 | 7 | FALSE | FALSE | FALSE |
| Agent | 6 | 14 | 1 | 1 | 5 | 5 | FALSE | FALSE |
| Web | 6 | 0 | 0 | 1 | 5 | FALSE | FALSE | FALSE |
| Client | 5 | 1 | 0 | 0 | 4 | FALSE | FALSE | FALSE |
| AD | 5 | 0 | 0 | 0 | 4 | FALSE | FALSE | FALSE |
| Fails | 2 | 3 | 2 | 1 | 1 | 1 | 10 | FALSE |
| Agents | 2 | 6 | 0 | 3 | 1 | 2 | FALSE | 2 |
| DB | 1 | 0 | 2 | 2 | FALSE | FALSE | 10 | 1 |
| Finesse | 0 | 27 | 0 | 13 | FALSE | 10 | FALSE | 10 |
| TOTAL | 56 | 58 | 6 | 29 |  |  |  |  |
| MIN | 1 | 1 | 1 | 1 |  |  |  |  |
| MAX | 11 | 27 | 2 | 13 |  |  |  |  |

After creating the matrix E, the appending module 122 may compute a category definition index (CDI). The category definition index may be computed using the below equation 4.

$$CDI = \max_i(e_j^i) \qquad 4$$

As shown in the equation 4, the CDI is a maximum cell value for each row in the matrix E or a maximum normalized frequency of occurrence in each row. The CDI may be used to identify a category name that may be appended to the corresponding data record in the training data set. The CDI may denote a column number of the matrix E which corresponds to the category name to be appended in the matrix E.

In one embodiment, if multiple columns of the matrix E contain the maximum normalized frequency of occurrence for a row, then any one of the corresponding category name may be randomly selected for appending to the corresponding data record. After identifying the category name to be appended in the corresponding data record, the category name may be appended to the corresponding data record maximum normalized frequency of occurrence times. Appending the category name to the corresponding data record biases the data classifier 104 to classify a data record in the category corresponding to the category name.

In an example, consider the first row of the matrix E corresponding to the concept 'error'. The maximum normalized frequency of '10' corresponds to the category 1. If a category name of the category 1 is "user access", the category name "user access" may be appended to the corresponding data record 10 times. The corresponding data record may be the data record in which the concept 'error' occurs. As the term "user access" occurs a significant number of times in the data record, the data classifier 104 may be biased to categorize the data record in the category "user access".

After appending the category name to the corresponding data records in the reformed training data set, the transformed training data set may be provided to the data classifier 104 to train the data classifier 104, thereby improving the accuracy of the data classifier 104.

FIG. 2 is a flow diagram illustrating a method 200 for transforming training data to improve data classification, in accordance with some embodiments of the present disclosure.

The method 200 may be described in the general context of computer executable instructions. Generally, computer executable instructions can include routines, programs, objects, components, data structures, procedures, modules, and functions, which perform particular functions or implement particular abstract data types. The method 200 may also be practiced in a distributed computing environment where functions are performed by remote processing devices that are linked through a communication network. In a distributed computing environment, computer executable instructions may be located in both local and remote computer storage media, including memory storage devices.

The order in which the method 200 is described is not intended to be construed as a limitation, and any number of the described method blocks can be combined in any order to implement the method 200 or alternative methods. Additionally, individual blocks may be deleted from the method 200 without departing from the spirit and scope of the subject matter described herein. Furthermore, the method 200 can be implemented in any suitable hardware, software, firmware, or combination thereof.

With reference to the FIG. 2, at block 202 concepts may be extracted from a training data set. In an example, the concepts may comprise a word or a phrase present in the training data set. The training data set comprises data records corresponding to one or more categories. Extracting the concepts from the training data set may be explained in detail in conjunction with the FIG. 1.

At block 204, frequency of occurrence of each concept in each category of the one or more categories may be computed. The frequency of occurrence of each concept in each category may be computed by creating a concept frequency matrix. A column in the concept frequency matrix may represent a category and a row may represent a concept. In an example, if each entry in the concept frequency matrix (M) may be denoted as $m_c^i$, then an entry in the concept frequency matrix may denote a number of data records that are labelled with category 'c' and contain the word 'i'. The computation of frequency of occurrence is explained in detail in conjunction with the FIG. 1.

At block 206, one or more concepts may be removed from the data records when the frequency of occurrence of a concept in a category is less than a threshold frequency value. The threshold frequency value may be computed dynamically based on the concept frequency matrix. The removing of the one or more concepts from the data records is explained in detail in conjunction with the FIG. 1.

At block 208, a percentage contribution of each concept of remaining concepts in each category may be computed upon removing the one or more concepts. The percentage contribution of each concept in each category may be computed by dividing each of the entries in the concept frequency matrix by their row sums and multiplying result by 100. The computation of percentage contribution of each concept of remaining concepts in each category is explained in conjunction with the FIG. 1.

At block 210, concepts may be eliminated, from the remaining concepts, contributing equally to each category based on the percentage contribution of each concept to provide a reformed training data set. The eliminating of concepts is explained in detail in conjunction with the FIG. 3.

At block 212, a category name may be appended to a corresponding data record in the reformed training data set based on a normalized frequency of occurrence of the concept in a category to improve data classification. The appending of the category name to the corresponding data record is explained in detail in conjunction with the FIG. 4.

FIG. 3 is a flow diagram illustrating a method for eliminating concepts corresponding to a row in an asymmetry matrix from a training data set in accordance with some embodiments of the present disclosure.

The method 300 may be described in the general context of computer executable instructions. Generally, computer executable instructions can include routines, programs, objects, components, data structures, procedures, modules, and functions, which perform particular functions or implement particular abstract data types. The method 300 may also be practiced in a distributed computing environment where functions are performed by remote processing devices that are linked through a communication network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternative methods. Additionally, individual blocks may be deleted from the method 300 without departing from the spirit and scope of the subject matter described herein. Furthermore, the method 300 can be implemented in any suitable hardware, software, firmware, or combination thereof.

With reference to the FIG. 3, at block 302, a maximum percentage contribution and a standard deviation for each row in the relative contribution matrix may be computed. The computation of the maximum percentage contribution is explained in detail in conjunction with the FIG. 1.

At block 304, an asymmetry matrix may be created. Each cell of the asymmetry matrix may comprise a distance of each cell value in the relative contribution matrix from the maximum percentage contribution of each concept. The distance of each cell value in the relative contribution matrix from the maximum percentage contribution of each concept may be computed based on standard deviation for each row in the relative contribution matrix. The creating of the asymmetry matrix is explained in detail in conjunction with the FIG. 1.

At block 306, concepts corresponding to a row in the asymmetry matrix may be eliminated from the training data set when a maximum distance of distances in the row of the asymmetry matrix is less than a pre-defined contribution value. In an example, the pre-defined contribution value may be 1.96. Thus, if a concept has percentage contribution that is not 1.96 standard deviations away, then the concept may not be identifying any category in a significant way. As the concept may not be required for data classification, the eliminating module 120 may eliminate the concept from the data records. The eliminating of the concepts from the data records is explained in detail in conjunction with the FIG. 1.

Figure 4:
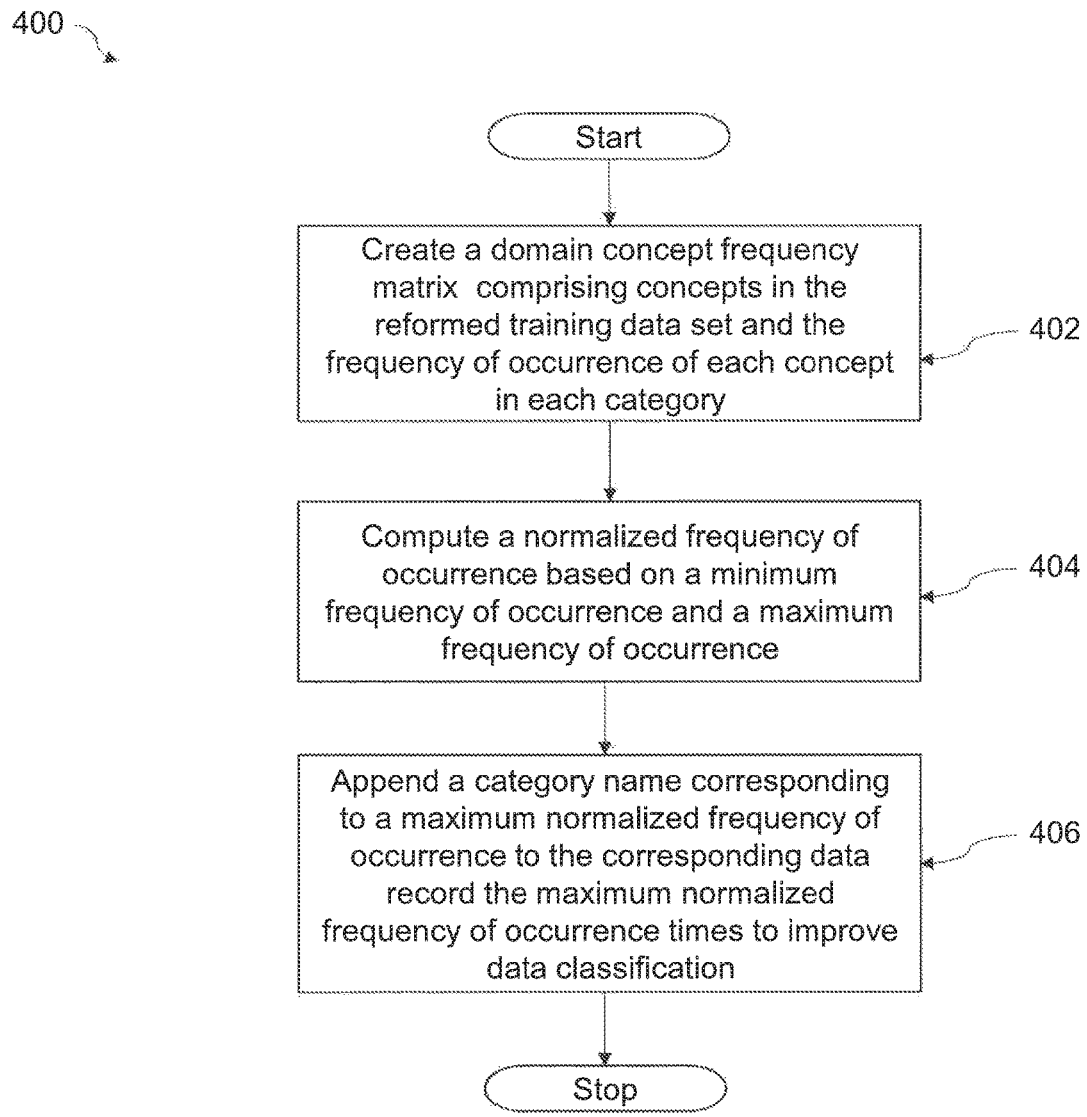
FIG. 4 is a flow diagram illustrating a method for appending a category name to a corresponding data record in a reformed training data set in accordance with some embodiments of the present disclosure.

FIG. 4 is a flow diagram illustrating a method for appending a category name to a corresponding data record in a reformed training data set in accordance with some embodiments of the present disclosure.

The method 400 may be described in the general context of computer executable instructions. Generally, computer executable instructions can include routines, programs, objects, components, data structures, procedures, modules, and functions, which perform particular functions or implement particular abstract data types. The method 400 may also be practiced in a distributed computing environment where functions are performed by remote processing devices that are linked through a communication network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternative methods. Additionally, individual blocks may be deleted from the method 400 without departing from the spirit and scope of the subject matter described herein. Furthermore, the method 400 can be implemented in any suitable hardware, software, firmware, or combination thereof.

With reference to the FIG. 4, at block 402, a domain concept frequency matrix may be created comprising concepts in the reformed training data set and the frequency of occurrence of each concept in each category. Further, a maximum value in each column j of the domain frequency matrix $max_j$ and a minimum value in each column j termed $min_j$ may be computed. The creating of the domain frequency matrix is explained in detail in conjunction with the FIG. 1.

At block 404, a normalized frequency of occurrence may be computed based on a minimum frequency of occurrence and a maximum frequency of occurrence. Further, the normalized frequency of occurrence may be used to create a matrix E. In the matrix E, a column may indicate a category and a row may indicate a concept. The computing of the normalized frequency of occurrence is explained in detail in conjunction with the FIG. 1.

At block 406, a category name corresponding to a maximum normalized frequency of occurrence may be appended to the corresponding data record the maximum normalized frequency of occurrence times to improve data classification. Appending the category name to the corresponding data record biases the data classifier 104 to classify a data record in the category corresponding to the category name.

The appending of the category name to the corresponding data record is explained in detail in conjunction with the FIG. 1.

Computer System

Figure 5:
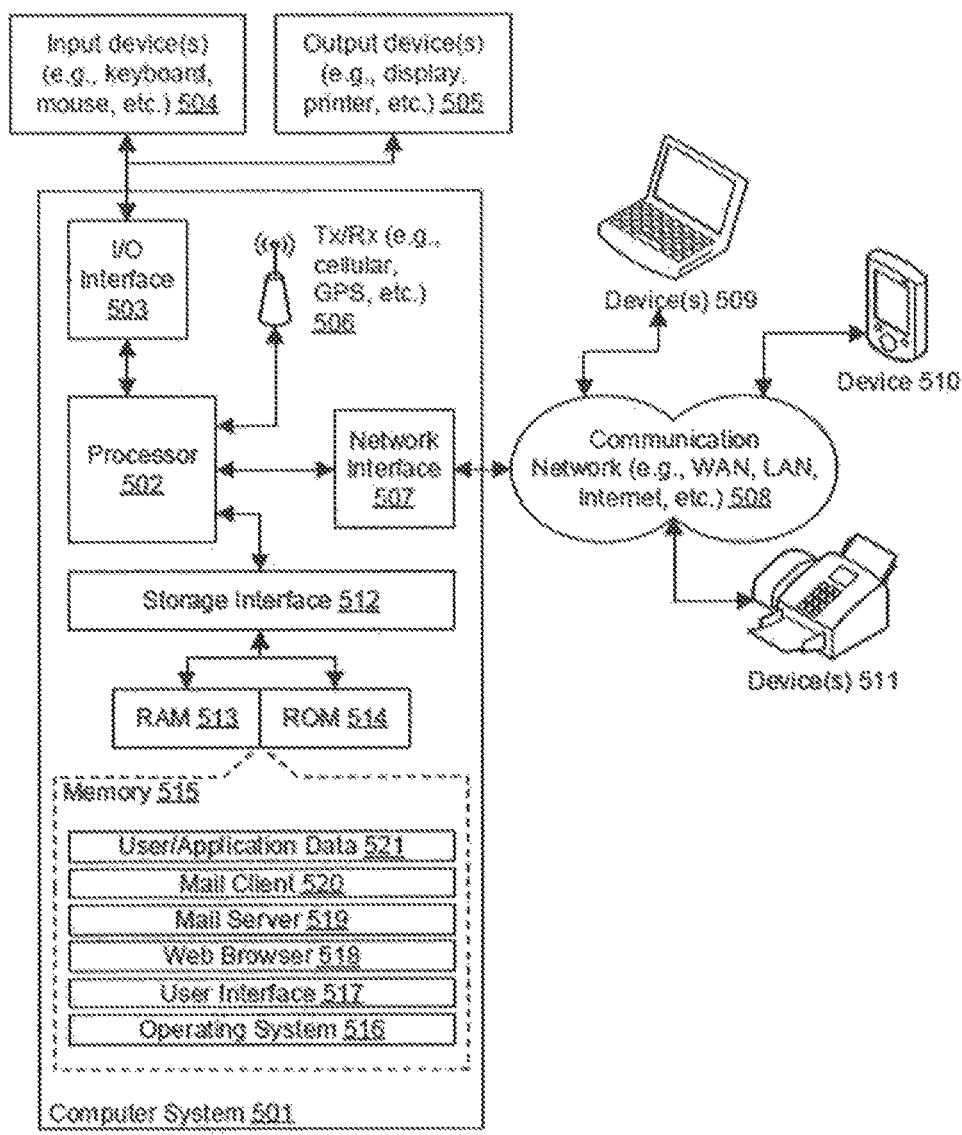
FIG. 5 is a block diagram of an exemplary computer system for implementing embodiments consistent with the present disclosure.

FIG. 5 is a block diagram of an exemplary computer system for implementing embodiments consistent with the present disclosure. Variations of computer system 501 may be used for implementing the extraction module 114, the computing module 116, the removing module 118, the eliminating module 120, and the appending module 122. Computer system 501 may comprise a central processing unit ("CPU" or "processor") 502. Processor 502 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dangle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 510, 511, and 512. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described systems and methods for transforming training data to improve data classification. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for transforming training data to improve data classification, the method comprising:
    extracting, by a data transforming system, concepts from a training data set, wherein the training data set comprises data records corresponding to one or more categories;
    computing, by the data transforming system, frequency of occurrence of each concept in each category of the one or more categories;
    removing, by the data transforming system, one or more concepts from the data records when the frequency of occurrence of a concept in a category is less than a threshold frequency value;
    computing, by the data transforming system, a percentage contribution of each concept of remaining concepts in each category upon removing the one or more concepts;
    eliminating, by the data transforming system, concepts, from the remaining concepts, contributing equally to each category based on the percentage contribution of each concept to provide a reformed training data set, wherein eliminating concepts contributing equally to each category comprises eliminating concepts corresponding to a row in an asymmetry matrix from the training data set when a maximum distance of distances in the row of the asymmetry matrix is less than a pre-defined contribution value; and
    appending, by the data transforming system, a category name to a corresponding data record in the reformed training data set based on a normalized frequency of occurrence of the concept in a category to improve data classification.

2. The method of claim 1, wherein computing the percentage contribution of each concept of the remaining concepts in each category further comprises creating a relative contribution matrix based on the percentage contribution of each concept in each category.

3. The method of claim 2, wherein eliminating concepts contributing equally to each category comprises:
    computing, by the data transformation system, a maximum percentage contribution and a standard deviation for each row in the relative contribution matrix; and
    creating, by the data transformation system, the asymmetry matrix, wherein each cell comprises a distance of each cell value in the relative contribution matrix from the maximum percentage contribution of each concept.

4. The method of claim 3, wherein the distance of each cell value in the relative contribution matrix from the maximum percentage contribution of each concept is computed using the standard deviation of each row in the relative contribution matrix.

5. The method of claim 1, wherein appending the category name to the corresponding data record comprises:
    creating, by the data transformation system, a domain concept frequency matrix comprising concepts in the reformed training data set and the frequency of occurrence of each concept in each category;
    computing, by the data transformation system, the normalized frequency of occurrence based on a minimum frequency of occurrence and a maximum frequency of occurrence; and appending, by the data transformation system, the category name corresponding to a maximum normalized frequency of occurrence to the corresponding data record the maximum normalized frequency of occurrence times to improve data classification.

6. The method of claim 1, wherein appending the category name to the corresponding data record biases a classifier to classify a data record in the category corresponding to the category name.

7. A data transforming system for transforming training data to improve data classification, the data transforming system comprising:
   a processor; and
   a memory communicatively coupled to the processor, wherein the memory stores processor instructions, which, on execution, causes the processor to:
   extract concepts from a training data set, wherein the training data set comprises data records corresponding to one or more categories;
   compute frequency of occurrence of each concept in each category of the one or more categories;
   remove one or more concepts from the data records when the frequency of occurrence of a concept in a category is less than a threshold frequency value;
   compute a percentage contribution of each concept of remaining concepts in each category upon removing the one or more concepts;
   eliminate concepts, from the remaining concepts, contributing equally to each category based on the percentage contribution of each concept to provide a reformed training data set, wherein eliminating concepts contributing equally to each category comprises eliminating concepts corresponding to a row in an asymmetry matrix from the training data set when a maximum distance of distances in the row of the asymmetry matrix is less than a pre-defined contribution value; and
   append a category name to a corresponding data record in the reformed training data set based on a normalized frequency of occurrence of the concept in a category to improve data classification.

8. The data transforming system of claim 7, wherein the processor is caused to create a relative contribution matrix based on a percentage contribution of each concept in each category.

9. The data transforming system of claim 8, wherein the processor is caused to:
   compute a maximum percentage contribution and a standard deviation for each row in the relative contribution matrix; and
   create the asymmetry matrix, wherein each cell comprises a distance of each cell value in the relative contribution matrix from the maximum percentage contribution of each concept.

10. The data transforming system of claim 9, wherein the distance of each cell value in the relative contribution matrix from the maximum percentage contribution of each concept is computed using the standard deviation of each row in the relative contribution matrix.

11. The data transforming system of claim 7, wherein the processor is caused to:
   create a domain concept frequency matrix comprising concepts in the reformed training data set and the frequency of occurrence of each concept in each category;
   compute the normalized frequency of occurrence based on a minimum frequency of occurrence and a maximum frequency of occurrence; and append the category name corresponding to a maximum normalized frequency of occurrence to the corresponding data record the maximum normalized frequency of occurrence times to improve data classification.

12. The data transforming system of claim 7, wherein appending the category name to the corresponding data record biases a classifier to classify a data record in the category corresponding to the category name.

13. A non-transitory computer-readable medium storing computer-executable instructions for:
   extracting concepts from a training data set, wherein the training data set comprises data records corresponding to one or more categories;
   computing frequency of occurrence of each concept in each category of the one or more categories;
   removing one or more concepts from the data records when the frequency of occurrence of a concept in a category is less than a threshold frequency value;
   computing a percentage contribution of each concept of remaining concepts in each category upon removing the one or more concepts;
   eliminating concepts, from the remaining concepts, contributing equally to each category based on the percentage contribution of each concept to provide a reformed training data set, wherein eliminating concepts contributing equally to each category comprises eliminating concepts corresponding to a row in an asymmetry matrix from the training data set when a maximum distance of distances in the row of the asymmetry matrix is less than a pre-defined contribution value; and
   appending a category name to a corresponding data record in the reformed training data set based on a normalized frequency of occurrence of the concept in a category to improve data classification.

14. The non-transitory computer-readable medium of claim 13, wherein computing the percentage contribution of each concept of the remaining concepts in each category further comprises creating a relative contribution matrix based on the percentage contribution of each concept in each category.

15. The non-transitory computer-readable medium of claim 14, wherein instructions for eliminating concepts contributing equally to each category comprises:
   computing a maximum percentage contribution and a standard deviation for each row in the relative contribution matrix; and
   creating the asymmetry matrix, wherein each cell comprises a distance of each cell value in the relative contribution matrix from the maximum percentage contribution of each concept.

16. The non-transitory computer-readable medium of claim 15, wherein the distance of each cell value in the relative contribution matrix from the maximum percentage contribution of each concept is computed using the standard deviation of each row in the relative contribution matrix.

17. The non-transitory computer-readable medium of claim 13, wherein instructions for appending the category name to the corresponding data record comprises:
   creating a domain concept frequency matrix comprising concepts in the reformed training data set and the frequency of occurrence of each concept in each category;
   computing the normalized frequency of occurrence based on a minimum frequency of occurrence and a maximum frequency of occurrence; and appending the category name corresponding to a maximum normalized frequency of occurrence to the corresponding data record the maximum normalized frequency of occurrence times to improve data classification.

18. The non-transitory computer-readable medium of claim 13, wherein appending the category name to the corresponding data record biases a classifier to classify a data record in the category corresponding to the category name.

* * * * *